United States Patent
Wang et al.

(10) Patent No.: US 11,816,576 B2
(45) Date of Patent: *Nov. 14, 2023

(54) IMAGE QUALITY ASSESSMENT USING SIMILAR SCENES AS REFERENCE

(71) Applicant: DeepNorth Inc., Foster City, CA (US)

(72) Inventors: Jinjun Wang, San Jose, CA (US); Yudong Liang, Xi'an (CN)

(73) Assignee: DEEP NORTH, INC., Redwood City, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 17/380,699

(22) Filed: Jul. 20, 2021

(65) Prior Publication Data

US 2021/0350243 A1 Nov. 11, 2021

Related U.S. Application Data

(63) Continuation of application No. 16/744,920, filed on Jan. 16, 2020, now Pat. No. 11,100,402, which is a (Continued)

(51) Int. Cl.
*G06T 7/00* (2017.01)
*G06N 3/084* (2023.01)
(Continued)

(52) U.S. Cl.
CPC .......... *G06N 3/084* (2013.01); *G06F 18/213* (2023.01); *G06F 18/24133* (2023.01);
(Continued)

(58) Field of Classification Search
CPC ........ G06N 3/084; G06N 3/0454; G06N 3/02; G06N 3/08–088; G06N 3/0445;
(Continued)

(56) References Cited

U.S. PATENT DOCUMENTS 10,636,148 B1 * 4/2020 Chen ...................... G06T 7/194
10,706,321 B1 * 7/2020 Chen ...................... G06V 20/64
(Continued)

*Primary Examiner* — Jose L Couso
(74) *Attorney, Agent, or Firm* — David R. Stevens; Stevens Law Group

(57) ABSTRACT

A system for image quality assessment of non-aligned images includes a first deep path portion of a convolutional neural network having a set of parameters and a second deep path portion of the convolutional neural network sharing a set of parameters with the first deep path convolutional neural network. Weights are shared between the first and second deep path convolutional neural networks to support extraction of a same set of features in each neural network pathway. Non-aligned reference and distorted images are respectively provided to the first and second deep paths of the convolutional neural network for processing. A concatenation layer is connected to both the first and second deep paths convolutional neural network, and a fully connected layer is connected to the concatenation layer to receive input from both the first and second deep paths of the convolutional neural network, generating an image quality assessment as a linear regressor and outputting an image quality score.

10 Claims, 2 Drawing Sheets

Related U.S. Application Data continuation of application No. 15/792,546, filed on Oct. 24, 2017, now Pat. No. 10,540,589.

(51) Int. Cl.
*G06T 7/33* (2017.01)
*G06V 10/44* (2022.01)
*G06V 10/98* (2022.01)
*G06F 18/213* (2023.01)
*G06F 18/2413* (2023.01)
*G06N 3/045* (2023.01)
*G06V 10/764* (2022.01)
*G06V 10/82* (2022.01)

(52) U.S. Cl.
CPC ........... *G06N 3/045* (2023.01); *G06T 7/0002* (2013.01); *G06T 7/337* (2017.01); *G06V 10/454* (2022.01); *G06V 10/764* (2022.01); *G06V 10/82* (2022.01); *G06V 10/993* (2022.01); *G06T 2207/20081* (2013.01); *G06T 2207/20084* (2013.01); *G06T 2207/30168* (2013.01)

(58) Field of Classification Search
CPC ........ G06N 7/00; G06N 20/00; G06K 9/6232; G06K 9/6271; G06K 7/1482; G06K 9/4628; G06K 9/036; G06K 9/4642; G06K 9/66; G06K 9/6269; G06K 9/629; G06K 9/6292; G06K 9/6277; G06T 7/0002; G06T 7/337; G06T 2207/20081; G06T 2207/20084; G06T 2207/30168; G06T 3/4046; G06T 9/002; G06T 7/0012; G06T 7/001; G06T 5/002; G06V 10/454; G06V 10/993; G06V 10/764; G06V 10/82; G06V 30/18057; G06V 10/50; G06V 10/806; G06V 10/809; G06V 30/194; G06V 30/19173; G06F 17/21; G06F 19/00; H04N 19/154; H04N 19/126; H04N 19/142; H04N 19/147
See application file for complete search history.

(56) References Cited

U.S. PATENT DOCUMENTS

| | | | |
|---|---|---|---|
| 2012/0269425 A1* | 10/2012 | Marchesotti | G06N 20/00 382/162 |
| 2012/0269441 A1* | 10/2012 | Marchesotti | G06V 10/806 382/195 |
| 2014/0307950 A1* | 10/2014 | Jancsary | G06T 5/003 382/154 |
| 2015/0030237 A1* | 1/2015 | Jancsary | G06K 9/6282 382/159 |
| 2015/0131898 A1* | 5/2015 | Schelten | G06T 5/003 382/159 |
| 2018/0268256 A1* | 9/2018 | Di Febbo | G06T 7/001 |
| 2018/0300589 A1* | 10/2018 | Levinshtein | G06K 9/6262 |

* cited by examiner

IMAGE QUALITY ASSESSMENT USING SIMILAR SCENES AS REFERENCE

CROSS REFERENCE TO RELATED PATENT APPLICATION

The present application is a continuation of U.S. patent application Ser. No. 16/744,920, filed Jan. 16, 2020, which is a continuation of U.S. patent application Ser. No. 15/792,546, filed Oct. 24, 2017. Both of which are hereby incorporated by reference in their entirety.

TECHNICAL FIELD

The present disclosure relates generally to a neural network based image quality assessment system capable of rating images that do not have aligned pixels. The system can include a dual deep path convolutional network architecture.

BACKGROUND

Image Quality Assessment (IQA) is essential for the design and evaluation of imaging, display and image processing systems. While the goal of an IQA system is to mimic and quantitatively rate a Human Vision System (HVS), the complexity of such a vision system makes it difficult to define a synthetic algorithm able to provide consistent results across different distortion types and different image contents. Existing IQA methods can be broadly categorized into the following three groups: full-reference (FR) IQA methods, reduced-reference (RR) IQA methods, and no-reference (NR) IQA methods. The former two groups, i.e., the FR IQA and the RR IQA methods groups, take advantage of complete or partial information of the "perfect" reference image respectively, while the NR IQA methods are often designed to extract discriminative features or to calculate natural scene statistics to qualify the image quality. FR IQA methods can often achieve results comparable to HVS.

Since conventional IQA methods can provide consistent evaluations for different image contents when they rely on to one or more reference images as baselines, they can readily be used in supervised or semi-supervised conditions. In many cases, existing methods require that the reference image must be pixel-wise aligned with a distorted image for reliable assessment. Unfortunately, pixelwise aligned reference images are often unavailable or difficult to extract, and this largely limits deployment of IQA applications.

SUMMARY

In one described embodiment, a method for image quality assessment of non-aligned images includes the steps of providing non-aligned reference and distorted images and inputting reference images to a first deep path of a convolutional neural network having a set of parameters. Distorted images can then be input to a second deep path of a convolutional neural network sharing a set of parameters with the first deep path convolutional neural network. Weights are shared between the first and second deep path convolutional neural networks to support extraction of a same set of features in each neural network. A fully connected layer is connected to receive input from both the first and second deep paths of the convolutional neural networks, generating an image quality assessment as a linear regressor and outputting an image quality score.

In some embodiments, both the first and second deep paths of the convolutional neural networks have multiple respective convolution layers, and at least one respective pooling layer. The first and second deep paths of the convolutional neural networks can feed into a concatenation layer to concatenate features from the first and second deep path convolutional neural networks with discriminative features being mapped in fully connected layers to generate the image quality assessment as a linear regressor. An image quality score can be output by minimizing a Euclidean loss.

In embodiments that provided for training the convolutional neural network, a training set for image quality assessment of non-aligned images can be generated. This can include the step of using raw images and providing non-aligned reference and distorted images by synthesizing a set of non-aligned images.

In another embodiment, a system for image quality assessment of non-aligned images includes a first deep path portion of a convolutional neural network having a set of parameters and a second deep path portion of the convolutional neural network sharing a set of parameters with the first deep path convolutional neural network. Weights are shared between the first and second deep path convolutional neural networks to support extraction of a same set of features in each neural network pathway. Non-aligned reference and distorted images are respectively provided to the first and second deep paths of the convolutional neural network for processing. A concatenation layer is connected to both the first and second deep paths convolutional neural network, and a fully connected layer is connected to the concatenation layer to receive input from both the first and second deep paths of the convolutional neural network, generating an image quality assessment as a linear regressor and outputting an image quality score.

DETAILED DESCRIPTION

Figure 1:
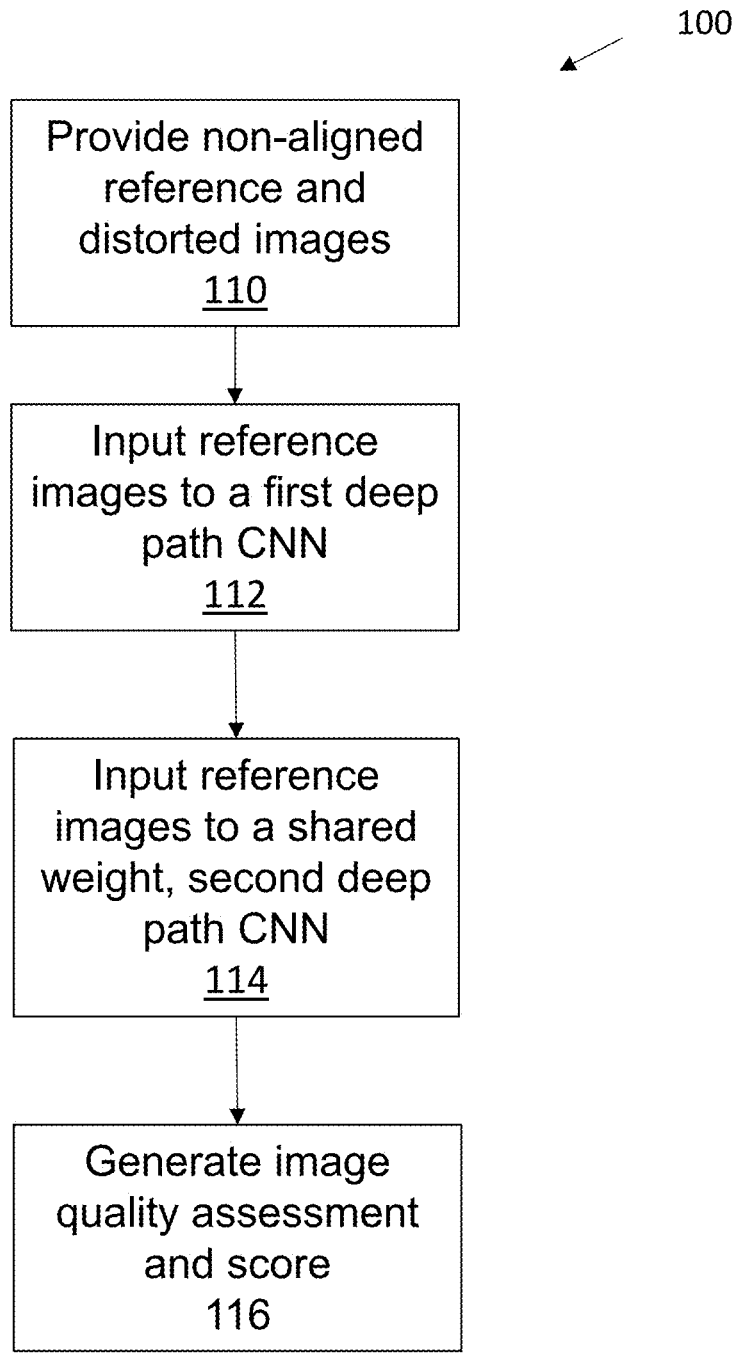
FIG. 1 is a system and method for image quality assessment.

FIG. 1 is a cartoon illustrating a method 100 for image quality assessment of non-aligned images. The method includes a step 110 of providing non-aligned reference and distorted images and inputting reference images to a first deep path of a convolutional neural network having a set of parameters. Distorted images can then be input to a second deep path of a convolutional neural network sharing a set of parameters with the first deep path convolutional neural network (step 112). Weights are shared between the first and second deep path convolutional neural networks to support extraction of a same set of features in each neural network (step 114). A fully connected layer is connected to receive input from both the first and second deep paths of the convolutional neural networks, generating an image quality assessment as a linear regressor and outputting an image quality score (step 116).

The described method can work in conjunction with neural networks, convolutional neural networks, cascade neural networks, Cascade Multi-Channel Convolutional Neural Network (CMC-CNN) models, recurrent neural networks, or other suitable machine learning systems based on dual deep learning systems having input both reference and distorted images. In some versions, network parameters can be set initially identical, while in other embodiments parameters can be shared between networks. Images can be derived from video, can be taken from one or more camera systems, or can be partially or completely synthetically created.

Figure 2:
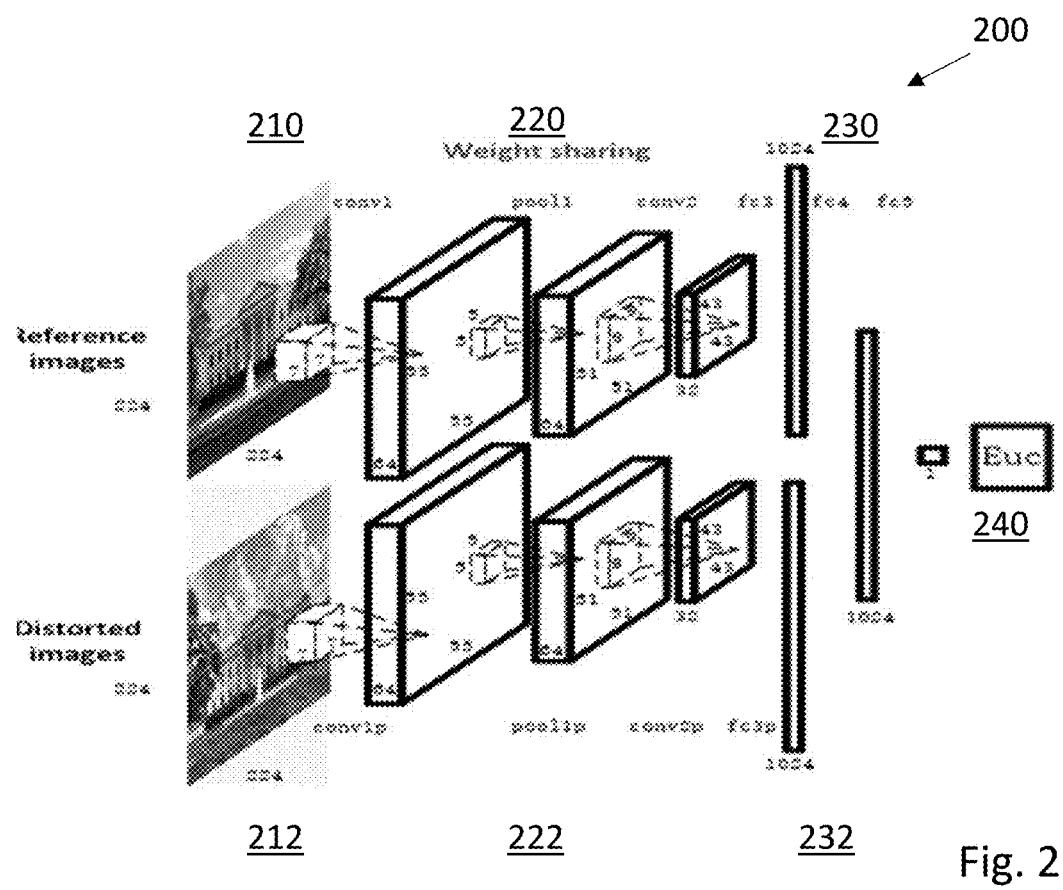
FIG. 2 is a dual path neural network capable of implementing an image quality assessment system.

The described method of FIG. 1 can be implemented with a dual convolutional neural network system 200 such as discussed with respect to FIG. 2. As seen in FIG. 2, two images can be input into the system 200: a reference image 210 and a distorted image 212. The system 200 provides processing by respective dual collections 220 and 22 of convolutional layers, pooling layers, and concatenation layers which feed into fully connected layers 230 and 232. Results are provided by a loss layer that implements a Euclidean loss or other suitable loss function to provide quantitative image comparisons.

In operation the neural network system 200 focuses on extracting features and avoiding pixel-wise alignment. This is generally achievable at deeper layers that integrate information from different receptive fields of earlier layers. The convolution, pooling and other nonlinear operations capture structural information from the local to the global area without explicit pixel-wise alignment, and therefore make the model geometrically robust. Typically, the fully connected layers do not act using simple element-wise subtractions, but will have obtained weights suitable to not only gauge image distortion between pairs. Additionally, the fully connected layers are configurable to ignore the feature disagreement from two paths caused by nonalignment of pixels. In effect, all of the distorted samples have different image contents (such as affine variations) from the reference counterpart; so that image contents are not discriminative.

More specifically, a suitable neural network for utilization of the described method and system for image quality assessment includes convolutional layers (conv), rectified linear unit (ReLU), pooling layers (pool), concatenation layers (concat), fully connected layers (fc), and a loss layer (loss).

The conv layers are trained to extract local features. In a recursive fashion, denoting $A_i^j$ as the feature map of path i in the $j^{th}$ layer, $W_j$ and $B_j$ as the weight and bias parameters of the $j^{th}$ layer, the local information is extracted into deeper layers by the following equation:

$$A_i^{j+1} = W_j * A_i^j + B_j$$

where * denotes the calculation of convolution.

In order to make a comparison between the distorted and the reference images, the same type of features can be extracted for the respective two neural network paths. In one embodiment, this can be realized by a weight sharing strategy that is applied in the dual neural network paths.

To increase the nonlinear properties and accelerate training, the activation function can be selected to be a rectified linear unit (ReLU) as follows:

$$A_i^{j+1} = \max(0, A_i^j)$$

Compensating for the offset between similar scene content between the distorted image and the reference image is important for effective operation. Pool layers can be exploited for this purpose by integrating features from a larger local receptive field. In one embodiment, a rather large sub-image (**224*224**) can be considered, and information from local to global integrated as the network goes deeper. For computational efficiency, max-pooling is applied as follows:

$$A_i^{j+1} = \max_R A_i^j$$

where R is the pooling region of corresponding position.

A concatenation layer concatenates the features from both paths. Then with the fully-connected (fc#) layer, discriminative features are further combined and mapped to generate image quality assessment in a linear regressor.

Finally, the image quality score is predicted by a loss function. In one embodiment, an image quality score is predicted by minimizing the following Euclidean loss function:

$$\min_{W,B} \| f(I_{ref}, I_{dis}); W, B) - Eva \|^2$$

where $I_{ref}$, $I_{dis}$ and Eva are the input sub reference, distorted images and human evaluations respectively, and W, B are the parameters of convolutional and fc layers.

The disclosed dual path convolutional neural network learns discriminative features from raw data to maximally preserve information from image. Only simple local contrast normalization is needed to ensure numeric stability. The process can also be understood as a data whitening process where the intensity value of pixel I(x;y) is normalized as:

$$I(x, y)_N = \frac{I(x, y) - u(x, y)}{\sigma(x, y) + \varepsilon}$$

$$u(x, y) = \sum_{a=-\frac{P}{2}}^{a=\frac{P}{2}} \sum_{b=-\frac{Q}{2}}^{b=\frac{Q}{2}} I(x+a, y+b)$$

$$\sigma(x, y) = \sqrt{\sum_{a=-\frac{P}{2}}^{a=\frac{P}{2}} \sum_{b=-\frac{Q}{2}}^{b=\frac{Q}{2}} (I(x+a, y+b) - u(x, y))^2}$$

where I(x; y)N denotes values at image location (x; y) normalized by pixels in a neighboring (P×Q) window, and ε is a small positive constant.

A dual path convolutional neural network can be trained using stochastic gradient descent with the standard backpropagation. In particular, the weights of the filters of the conv or fc layer can be updated as follows:

$$\Delta_{i+1} = m \Box \Delta_i - \eta \frac{\partial L}{\partial W_i^j}$$

$$W_{i+1}^j = W_i^j + \Delta_{i+1} - \lambda \eta W_i^j$$

where m is the momentum factors, η is the learning rate, j is index of the layer and $\Delta_{i+1}$ is the gradient increment for training iteration i. λ is the weight decay factor. Momentum factor and weight decay factor may be chosen as 0.9 and 0.0005 respectively in our systems.

In one experimentally realized embodiment, testing and training relied on synthesized images. Since reference images are aligned with the corresponding distorted images, in order to train and test the neural network, an affine transform was applied to original reference images, since non-aligned reference images can preserve structures with affine transformation. The scaling factors s# and rotation θ were randomly selected to range from 0.95 to 1.05 and −5° to 5° respectively.

Figure 3:
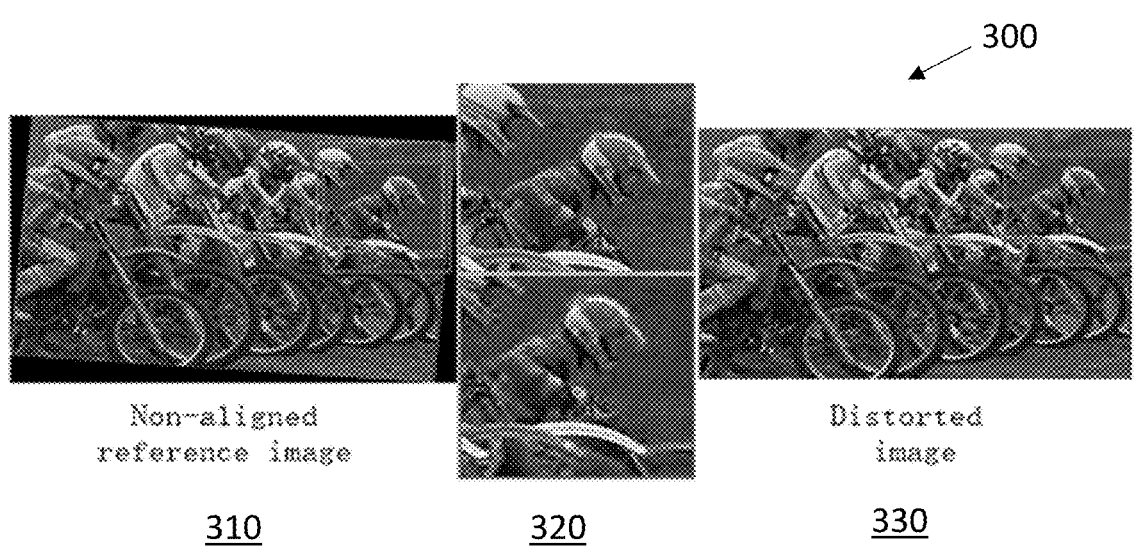
FIG. 3 illustrates differences between non-aligned reference and distorted images.

As shown in images 300 of FIG. 3, such a pair of training samples can be collected as follows: for each reference image 310 that is aligned with a distorted image 330, an affine transform is applied. Then from within the border, multiple 224×224 sub-images are randomly sampled from both the transformed reference image and the distorted image, centering at the same coordinates. As can be seen, dual images 320 provide one pair of sub-images for training, having similar but not aligned image content. In one embodiment, a stride of twenty (20) can applied to extract sub-images. Hundreds of thousands of such pairs can be selected as samples for training dual path neural network model such as described.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices.

When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. An apparatus comprising:
   at least one camera system providing distorted images; and
   a computer system including a first deep path convolutional neural network, a second deep path convolutional neural network and a fully connected layer, the first deep path convolutional neural network accessing reference images while using a set of parameters, the second deep path convolutional neural network receiving the distorted images from the at least one camera system, the second deep path convolutional neural network sharing the set of parameters with the first deep path convolutional neural network, the first deep path convolutional neural network and the second deep path convolutional neural network sharing weights to support extraction of a same set of features, and the fully connected layer configured to receive input from both the first deep path convolutional neural network and the second deep path convolutional neural network, generate an image quality assessment as a linear regressor, and output an image quality score.

2. The apparatus of claim 1, wherein both the first and second deep paths of the convolutional neural network have multiple respective convolution layers, and at least one respective pooling layer.

3. The apparatus of claim 2, wherein a pooling layer processes a sub-image derived from a reference image or a distorted image.

4. The apparatus of claim 3, wherein the dimensions of the sub-image are 224 pixels×224 pixels.

5. The apparatus of claim 1, wherein both the first and second deep paths of the convolutional neural network feed into a concatenation layer to concatenate features from the first and second deep paths of the convolutional neural networks.

6. The apparatus of claim 1, wherein both the first and second deep paths of the convolutional neural network feed into a concatenation layer to concatenate features from the first and second deep paths of the convolutional neural network and discriminative features are mapped in fully connected layers to generate the image quality assessment as a linear regressor.

7. The apparatus of claim 1, wherein the image quality score is output by minimizing a Euclidean loss.

8. The apparatus of claim 1, wherein numeric stability is obtained by local contrast normalization.

9. The apparatus of claim 8, wherein the local contrast normalization is a data whitening process.

10. The apparatus of claim 1, wherein the first and second deep paths of the convolutional neural network are trained using a stochastic gradient descent with a standard back-propagation.

* * * * *